M. E. PELTZ.
WEED PULLER.
APPLICATION FILED NOV. 11, 1916.
1,242,468.
Patented Oct. 9, 1917.
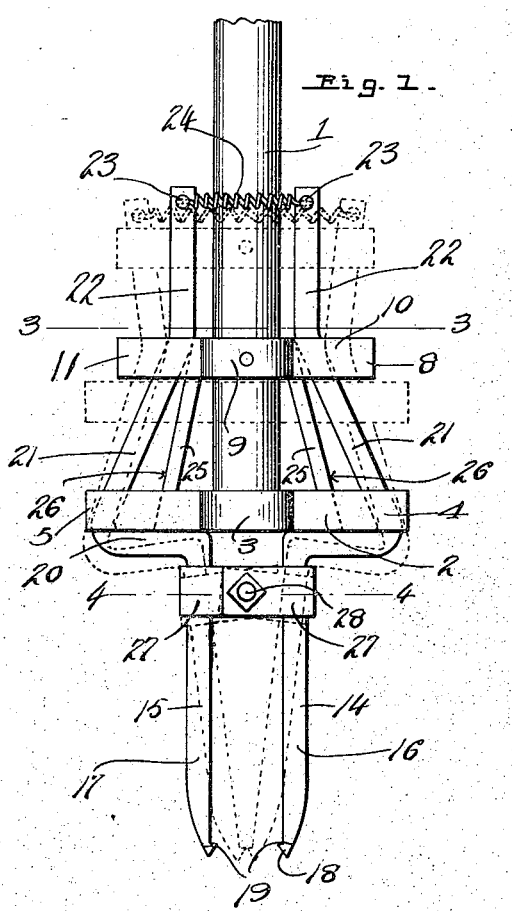
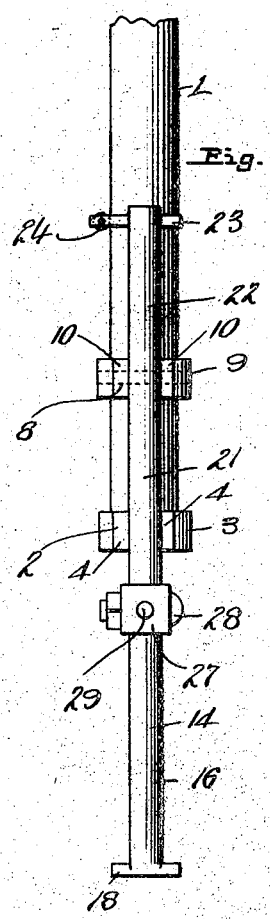
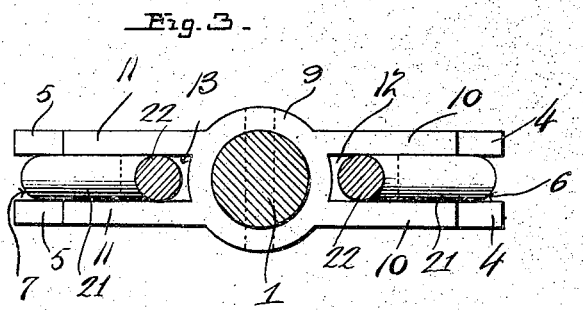
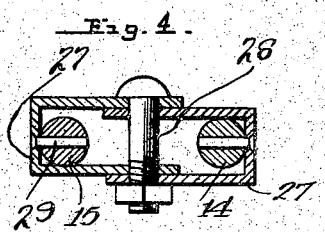
INVENTOR
Mancil E. Peltz.
WITNESSES
Chas. E. Kemper,
Wm. H. Milligan
BY Richard B. Owen,
ATTORNEY

UNITED STATES PATENT OFFICE.

MANCIL E. PELTZ, OF MALAD CITY, IDAHO.

WEED-PULLER.

1,242,468.

Specification of Letters Patent.

Patented Oct. 9, 1917.

Application filed November 11, 1916. Serial No. 130,839.

*To all whom it may concern:*

Be it known that I, MANCIL E. PELTZ, a citizen of the United States, residing at Malad City, in the county of Oneida and State of Idaho, have invented certain new and useful Improvements in Weed-Pullers, of which the following is a specification.

This invention relates to a weed puller and the primary object of the invention is to provide a pair of gripping jaws adapted to be opened and closed by a movement of the operating handle whereby the jaws may be made to grasp a weed and pull the same from the ground by its roots and also permitting the weed to be released from the jaws by a pressure on the handle.

As a further object of the invention the device is provided with a pair of pivoted jaws loosely supported by a pair of retaining members fastened to the end of an operating handle and adapted to open and close the jaws when the said retaining members are moved away from or toward the ends of the jaws.

Another object of the invention is to provide a pair of pivoted jaws having their ends connected by a spring member for normally holding the jaws in open position, while the handle carries retaining member for coöperating with the supporting arms of the jaws whereby, by virtue of the said spring, the jaws may be opened or closed when the said retaining members are moved by the handle.

A further object of this invention is the provision of a weed puller which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation showing the device in open position by full lines and in closed position by dotted lines.

Fig. 2 is an edge elevation.

Fig. 3 is a section on the line 3—3 of Fig. 1.

Fig. 4 is a section on the line 4—4 of Fig. 1.

Referring to the drawing, wherein is illustrated the preferred form of my invention, and in which like numerals of reference indicate corresponding parts throughout the several views, the handle 1 may be of any desired length and its extreme lower end is fastened to a retaining yoke 2 which comprises an annular collar 3 having a central opening for receiving the end of the handle 1. Extending in opposite directions from the collar 3 are the arms 4 and 5 arranged in pairs and spaced apart thereby providing the yokes 6 and 7. A second retaining yoke 8 is fastened to the handle at a point above the collar 3 and comprises an annular collar 9 rigidly secured to the handle 1 and provided with the oppositely extending arms 10 and 11 which, it will be noted, are slightly shorter in length than the arms 4 and 5 of the retaining member 2. The arms 10 and 11 are also arranged in pairs thereby providing a space between each pair of arms for forming the superposed retaining yokes 12 and 13.

For grasping the roots of a weed, I provide a pair of jaws 14 and 15 which are preferably constructed from steel and the jaws comprise the gripping members 16 and 17 each having its lower extremity provided with a cleat 18 which, as shown in Fig. 1 of the drawing is substantially triangular in cross section and has one of its longitudinal edges projecting toward the corresponding cleat thus providing a gripping blade 19 which blades are adapted to be brought into contact when the jaws are closed as shown by dotted lines in Fig. 1. At the upper end of the jaws 14 and 15 the same are bent at right angles to extend outwardly in opposite directions thereby providing pressure arms 20 the ends of which are integrally formed with the angularly disposed connecting arms 21.

The upper ends of the connecting arms 21 are bent to provide the upwardly projecting retaining arms 22. The terminal of each of the arms 22 carries a transversely extending bolt 23 to which the ends of a tension spring 24 are fixed whereby the arms 22 will be normally drawn toward each other for holding the members 16 and 17 in open position as shown by full lines in Fig. 1.

Integrally formed with each of the retaining yokes 2 and 8 is a pair of supporting arms 25 which are disposed at an angle and their outer surfaces provide operating bearing surfaces for contacting with the arms 21 whereby the jaws will be closed and opened when the said retaining yokes are raised and lowered. The bifurcated portions of the retaining yokes 2 and 8, that is the spaces 6, 7, 12 and 13 between the arms, are limited in their length by the disposition of the ends of the arms 25. Thus it will be noted that the operating bearing surfaces 26 extend along the outer faces of the arms 25 and into the spaces between the arms of the retaining yokes.

The gripping members 16 and 17 are pivotally connected together by a hinge which comprises the pivoting elements 27 identical in construction and of U-shaped formation. The ends of the U-shaped members, as shown by Fig. 4 of the drawing are provided with openings through which a pivot bolt 28 is extended and which is held in place by a nut carried by the end of the bolt. The gripping members 16 and 17 are attached to the end portions of the U-shaped members 27 by the fastening bolts or rivets 29 and, it will be observed, by referring to Fig. 4 of the drawing, that the openings in each U-shaped member which receives the end of the rivet 29 are disposed slightly off center so that the gripping members 14 and 15 will be in alinement with each other.

In operation, the jaws will be held in open position and the points thereof will be driven into the ground at opposite sides of the weed which is to be removed and when the handle is pulled upwardly the inclined operating surfaces 26 will contact with the upper ends of the arms 21 thereby swinging the jaws on the pivot bolt 28 until they assume the position shown by dotted lines in Fig. 1. This will bring the gripping blade of each jaw in engagement with the roots of the weed and a continued pull on the handle will cause the weed to be withdrawn from the ground. As soon as this has been done and the weed held over a container where it is to be deposited the handle may be pressed downwardly and the action of the spring 24 will cause the jaws to be moved to open position for the necessary operation of the device.

From the foregoing it will be observed that a very simple and durable weed puller has been provided, the details of which embody the preferred form. I desire it to be understood however, that slight changes in the minor details of construction may be made without departing from the spirit of the invention or the scope of the claims hereunto appended.

I claim:

1. A weed puller comprising a pair of gripping jaws, retaining yokes, the said jaws having extensions received in the said yokes, a tensioning element connected to the terminals of the said extensions for normally maintaining the said jaws in open position, and manually operated means engageable with the said extensions to move the said extensions against the tension of the said tensioning element.

2. A weed puller comprising a pair of gripping jaws, a pair of retaining yokes, supporting arms disposed at an angle and carried by the said retaining yokes, means for longitudinally moving the said retaining yokes, and means coöperating with the said supporting arms for opening and closing the jaws when the retaining yokes are actuated.

3. A weed puller comprising a pair of gripping jaws pivotally connected together, a handle, a pair of retaining yokes carried by the handle, supporting arms disposed at an angle and integrally connected at their ends to the said retaining yokes whereby the yokes will be held in spaced relation, and means connected to the said jaws and adapted to coöperate with the said supporting arms for opening and closing the jaws when the said handle is raised or lowered.

4. A weed puller comprising a handle, retaining yokes arranged upon the handle in spaced relation to each other and including bifurcated laterally projecting portions, connecting arms connected to the said yokes and disposed at an angle to provide bearing surfaces, and gripping means including connecting arms adapted to coöperate with the said bearing surfaces for moving said gripping means into operative or inoperative position.

5. A weed puller comprising a handle having a pair of retaining yokes fastened thereto, gripping elements, means connected to the said gripping elements and adapted to coöperate with the said retaining yokes for opening and closing the said gripping elements and means for pivotally connecting the gripping elements together independent of the said handle.

6. A weed puller comprising a pair of gripping jaws each having its terminal provided with a cleat, the proximate edges of the cleats providing a gripping plate on each jaw, connecting arms carried by the jaws and provided with upwardly projecting retaining arms, a tension spring having its terminals fastened to the ends of said retaining arms for normally holding the jaws in open position, the said jaws being pivotally connected together, and means associated with the said connecting arms for closing the said jaws against the action of the said tension spring.

In testimony whereof I affix my signature in presence of two witnesses.

MANCIL E. PELTZ.

Witnesses:
FRANK CLOVE,
E. W. DECKER.